Apr. 3, 1923.
A. O. ABBOTT, JR
1,450,163
HEAVY TRUCK TIRE FLAP
Filed Oct. 4, 1920
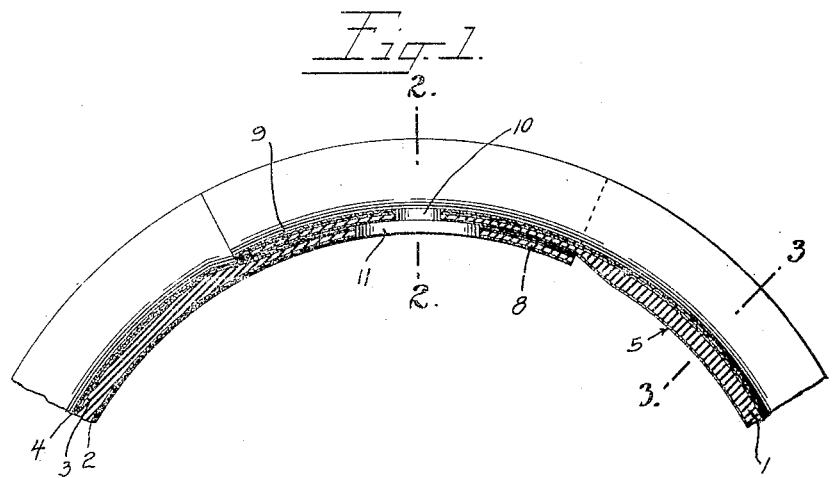
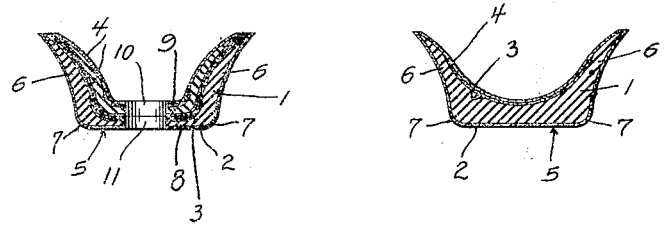
Inventor
Adrian O. Abbott, Jr.
By his Attorney
Ernest Hopkinson Patented Apr. 3, 1923.

1,450,163

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

HEAVY-TRUCK-TIRE FLAP.

Application filed October 4, 1920. Serial No. 414,495.

*To all whom it may concern:*

Be it known that I, ADRIAN O. ABBOTT, Jr., a citizen of the United States, residing at Detroit, county of Wayne and State of Michigan, have invented certain new and useful Improvements in Heavy-Truck-Tire Flaps, of which the following is a full, clear, and exact description.

This invention relates to tire flaps which are used to prevent the relatively delicate inner tube of pneumatic tires from being pinched between tire beads and the wheel rim or felloe.

Flaps for ordinary sized pneumatic tires are usually constructed of frictioned plies of fabric that are laminated together. While the superimposed plies of such flaps vary a little in width they form an article of substantially the same thickness throughout its width. It has been found that these laminated fabric flaps are not satisfactory for such large pneumatics as are used on trucks and particularly when the inside bead walls of the casing are in service nearly at right angles to the wheel rim, as is the case with some kinds of straight sided tires having inextensible beads.

The present invention aims to provide a flap that will anchor the beads of heavy truck tire casings against lateral shifting towards one another; that will grip and brace the casing in a manner relieving its side walls from abrupt shearing stress along the lines where they project from the side flanges of the wheel rim, and resulting from the inflation pressure within the inner tube; that is shaped to define with the interior of the casing a tube-receiving cavity of nearly circular cross-section and free of corners or abrupt changes in curvature; and that has its ends reduced in thickness and of molded construction like its intermediate body.

The invention is illustrated in the accompanying drawings, in which

Fig. 1 is a longitudinal cross section through lapped ends of the flap, and

Figs. 2 and 3 are cross sections of the flap on lines 2—2 and 3—3 respectively of Fig. 1.

The flap is composed of rubber composition 1 and plies of covering fabric 2, 3 and 4 which extend from one end of the article to the other and form a durable wear surface as well as a reinforcement for the rubber composition body. The intermediate body of the flap is of the trough shape shown in cross section in Fig. 3. A substantially flat base 5 is provided to engage the wheel rim between the beads or toes of the outer casing, which latter are engaged by the flanges or side walls 6 of the flap. The side walls decrease in thickness towards their edges and are flared so as to lie snugly against the inside walls of the casing. The faces of the side walls 6 and seating surface 5 meet at a substantial angle and form shoulders 7 that hold the beads of the casing against movement. The bevelled or tapering edges of the side flanges 6 terminate at an elevation a little above the elevation of the point where the casing normally leaves the rim flanges and tend to distribute or spread the shearing stress on the side walls of the casing to which they are subjected when the inner tube is inflated.

The ends 8 and 9 of the flap are reduced in thickness so that when lapped as shown in Fig. 1 the periphery of the tube engaging curved face will be substantially circular and not interrupted by a pocket or depression. The reduced ends are preferably formed by molding them integral with the body between the sections of a mold whose cavity corresponds in shape to that of the flap. At opposite ends of the flap the reduction in thickness is made upon opposite sides of the flap, that is, a depression is formed in the tube engaging face of one end of the flap while the other end of the flap has its outer surface reduced so as to fit into the depression of the first mentioned end of the flap. And preferably the reductions in thickness of the opposite ends of the flap are sufficient to make the lapped ends of the flap equal in thickness the intermediate body portion of the flap.

In the manufacture, one half of a mold is lined with the fabric ply 2, a strip of unvulcanized rubber composition is introduced and then the fabric plies 3 and 4 superimposed in the rubber composition. The top half of the mold is then mounted in position and the thus filled mold introduced into a vulcanizer such as a press having steam heated platens.

After curing, the reduced ends of the flap are apertured as indicated at 10 and 11 to receive a valve stem.

From the foregoing description it will be apparent that I have provided a new and useful flap that will not only anchor or hold the beads of tire casings against lateral shifting towards each other, but will also grip and brace the casing at the beads so as to distribute the shearing stress that would otherwise be applied to the tire casing where it immerges from the rim flanges. The inner tube cavity that is defined by the casing and the flap is substantially circular or elliptical in cross section and offers no corner or ledge in which the inner tube may lodge in a condition distorted from its normal circular form, thus tending to prolong its life. And by the molded construction of the reduced ends of the flap greater durability is secured than has heretofore been achieved with hand-skived flaps wherein the vulcanized rubber has been cut or scraped from the fabric and where deterioration has been liable by the action of air and water. The molded reduced ends being made in the same operation as the major or body portion of the flap, the articles may be manufactured more cheaply and uniformly.

Having thus described my invention, what I claim and desire to protect by Letters Patent is:

1. A trough-shaped tire flap composed of a body of vulcanized rubber composition whose opposite ends are reduced in thickness on the inside and outside respectively thereof, and fabric covering the outside and inside of the flap and united by vulcanization to the body of rubber composition.

2. A molded trough-shaped tire flap having outer covering plies of fabric and an intermediate body of rubber composition, one end of said flap having a depression on its tube engaging face and the other end of said flap being reduced externally to fit within said depression whereby when the ends of the flap are lapped a substantially continuous, smooth, annular surface may be presented to an inner tube.

3. A pneumatic tire flap comprising an annular, substantially flat-bottomed, trough-shaped structure having overlapped ends and composed of surface plies of fabric and an interposed filler of vulcanized rubber composition.

4. A pneumatic tire flap consisting of a strip of rubber composition having a base portion with a flat rim-engaging face adapted to be seated on a wheel-rim and fill the space between the beaded portions of a casing, upstanding flanges of increasing flexibility towards their free edges and of a length and thickness adapted to relieve the side walls of a casing from abrupt shearing stress in the region of the rim flanges, and overlapping ends reduced in thickness on their outside and inside respectively, said flap having a curved tube-engaging face which defines with the inside of a casing a tube-receiving cavity of nearly circular cross-section.

Signed at Detroit, county of Wayne, State of Michigan, this 27th day of September, 1920.

ADRIAN O. ABBOTT, Jr.